Figure 1:
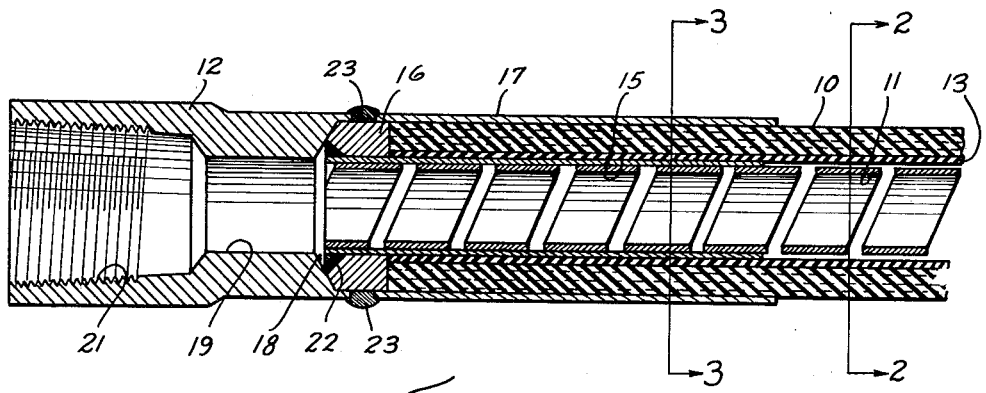

March 9, 1954      R. G. BARNES      2,671,325

CASING FOR FLEXIBLE SHAFTS

Filed Feb. 25, 1950

Inventor

R. Glenn Barnes

Tom Walker
Attorney

Patented Mar. 9, 1954

2,671,325

UNITED STATES PATENT OFFICE 2,671,325

CASING FOR FLEXIBLE SHAFTS

Ralph Glenn Barnes, Reno, Nev., assignor to Master Vibrator Company, Dayton, Ohio, a corporation of Ohio Application February 25, 1950, Serial No. 146,320

3 Claims. (Cl. 64—3)

This invention relates to flexible shafts, and more particularly to casings therefor.

In flexible shafts, a metallic flexible core comprises the shaft proper. The core is, however, fully enclosed and protected by a casing including an outer rubber or rubber-like sheath and a metallic inner liner which provides a direct bearing for the core. The inner liner, which is a wound helical strip, is ordinarily installed in the sheath by being allowed to expand into a tight engagement with the internal wall of the sheath. Casings as so constructed have certain disadvantages. The rubber sheath is subject to swelling as a result of absorption of lubricant applied along the core. Further the sheath can be stretched in use to an extent that it becomes inoperative in conjunction with the enclosed core. Further, the frictional heat engendered by rotation of the core in the inner liner is transmitted to the rubber sheath, with resultant deterioration to the rubber and addition to the difficulties of handling.

The instant invention proposes a flexible shaft casing in which the disadvantages of the prior art devices are obviated, the provision of a casing so characterized being the object of the invention. In carrying out the object of the invention, a casing has been evolved in which the rubber or rubber-like outer sheath is made materially resistant to oil absorption and to stretching, and in which the inner liner has a floating mounting in the outer sheath. By reason of the floating mounting of the inner liner, there is established between the inner liner and the sheath an annular air space insulating the sheath against the effects of friction generated heat. Further an opportunity is afforded for the inner liner to flex and vibrate in accompaniment with the core but independently of the sheath. In the operation of the shaft, therefore, the outer sheath will remain relatively cool and will, moreover, lie relatively still, unresponsive to the internal activity of the core.

The object of the invention is to simplify the construction as well as the mode of operation of flexible shaft casings as disclosed herein whereby such casings may not only be economically manufactured, but will be more efficient and satisfactory in use, adaptable to a wide variety of work applications, having relatively few parts and be unlikely to get out of repair.

A further object of the invention is to provide a casing for a flexible shaft assembly which is relatively resistant to longitudinal expansion or contraction.

A further object of the invention is to provide a casing for a flexible shaft assembly which is substantially impervious to oil and other lubricants employed in connection with the revolving core.

A further object of the invention is to provide a casing of the character described in which vibratory impulses are substantially dampened.

A further object of the invention is to provide a casing for a flexible shaft assembly in which extreme temperature differentials are substantially reduced and held to a minimum.

A further object of the invention is to provide a casing for a flexible shaft assembly possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Figure 2:
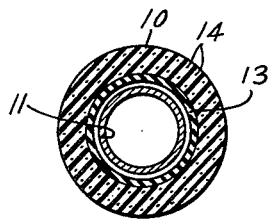
Figure 3:
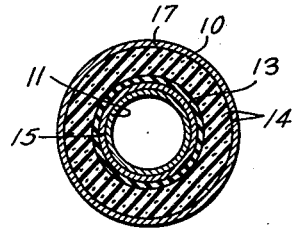

Referring to the accompanying drawing, wherein is found the preferred but obviously not necessarily the only form of embodiment of the invention, Fig. 1 is a longitudinal sectional view of one end of a flexible shaft casing in accordance with the instant invention;

Fig. 2 is a view in cross section taken substantially along the line 2—2 of Fig. 1; and Fig. 3 is a sectional view taken substantially along line 3—3 of Fig. 1.

Referring to the drawing, the flexible shaft casing of the invention comprises generally an outer sheath or tube 10 made essentially of rubber or rubber-like material. Within the tube 10 is a flexible inner liner 11 in the form of a helically wound metallic strip. The liner 11 provides a direct bearing for the core of the shaft (not shown). The assembly comprising the tube 10 and liner 11 is at its opposite ends received in and connected to fittings, as the fitting 12, for attachment of the casing at its one end to a motor and at its other end to the tool or other device to be driven.

The fittings 12 will ordinarily be substantially the same in construction, as will be the manner of connection of the tube and liner assembly thereto. Accordingly, only one end of the casing is here illustrated.

Referring more particularly to the elements of the casing, the tube 10 is made resistant to swelling, and deterioration resulting from the absorption of oil, by an internal lining 13 of oil resistant material, such, for example, as "neoprene" or similar material. This layer of oil resistant material is bonded directly to the internal wall of the tube and substantially precludes absorption by the material of the tube of lubricants and other fluids which may be used in connection with the core of the flexible shaft.

The tube 10 is further made resistant to stretching by inclusion in the material thereof of longitudinally extending fibrous strands 14. Having a character and function similar to tire cords, the strands 14 help the tube 10 to retain its initial axial dimension under the varying tensions of torque and pulling to which it is subjected in use.

The inner liner 11 is preliminarily wound, in helix form, upon a mandrel and so inserted into the tube 10, the mandrel being subsequently withdrawn. In accordance with the instant invention, the inner liner is wound to a diameter which is less than the internal diameter of the tube 10. As installed in the tube, therefore, the inner liner is free for relative lateral motion and is concentrically mounted in the tube to provide a surrounding air space of predetermined dimension, for example, one thirty second of an inch.

The described floating mounting of the inner liner is achieved by fixing the ends thereof with respect to the tube 10 and the fittings 12. As shown, the end of the inner liner 11 projects slightly beyond the end of the tube 10. A sleeve 15 is slipped over the end of the inner liner 11 and extends in telescoping relation thereto a short distance into the tube 10. The dimensions of the sleeve 15, which are predetermined to correspond to the desired annular clearance around the inner liner 11, are such that the sleeve has a common, intimate contact with the inner liner 11 and the tube 10 throughout their touching lengths. The sleeve 15 accordingly functions as a spacer, setting up a substantially fixed concentric relation of the inner liner 11 to the tube 10.

Surrounding the projecting end of the sleeve 15 and inner liner 11 and fixedly secured thereto, is a ferrule ring 16 which serves to connect the inner liner 11 to the fitting 12 and to provide an abutment collar for the tube 10. The end assembly comprising the ring 16, sleeve 15, liner 11 and tube 10 is received in a cylindrical extension 17 on the fitting 12, such extension being approximately coincident in length with the sleeve 15. At the base of the extension 17, within the fitting 12, is an inwardly sloping seat 18 for the ferrule ring 16. The seat 18 terminates in an axial bore 19 in the fitting registering with the inner liner 11 and providing a passageway through the fitting for the core. A counterbore 21 in the fitting is internally threaded for connection of the fitting to the motor or tool, as the case may be.

As integrated, connected relation is established and maintained between the elements of the end assembly. Thus, the tube 10 is bonded by rubber cement or the like to the extension 17 and to the sleeve 15. The ferrule ring 16, sleeve 15 and inner liner 11 are united by a weld 22 applied in a counterbore in the back of the ring 16. Another series of welds 23, applied through radial openings in extension 17, rigidly interconnects the ferrule ring 16 and the fitting 12.

In accordance with the described construction, therefore, the flexible shaft casing of the invention provides for a floating mounting of the inner liner 11 with attendant advantages heretofore described, as well as material resistance of the tube 10 to swelling or stretching. Moreover, an end construction for the casing is provided which defines and controls the floating inner liner and precludes axial displacement thereof. The length of the bearing provided by the sleeve 15 can be relatively short in the overall length of the casing since it needs function only to define the relationship of the inner liner to the tube 10. Relative flexure of the tube, with possible damage thereto and loss of the seal between the sleeve and tube is avoided by projecting the extension 17 in surrounding relation to the sleeve 15, thereby effectively clamping the intermediate length of tube 10.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one or several modes of putting the invention into effect.

Having thus described my invention, I claim:

1. A casing for a flexible shaft, including a length of flexible tubing, an inner liner in said tubing of a diameter less than the internal diameter of said tubing, and a length somewhat greater than the length of said tubing, spacer sleeves on the ends of said liner supporting the ends of said liner against lateral motion relative to the tubing, a ferrule ring on the outer tip of each said sleeves connected to said sleeve and to the inner liner, said rings having abutting relation to the ends of the tubing, and opposed fittings each presenting a seat for an associated ferrule ring and a cylindrical extension projecting in surrounding and contacting relation to the ferrule ring and the associated end of said tubing, said extension being secured to the ferrule ring.

2. A casing for a flexible shaft, including a length of non-metallic flexible hose, a metallic helically wound inner liner in said tubing, said liner being wound to a diameter less than the internal diameter of said tubing for a floating mounting in said tubing and projecting beyond the ends of said tubing, a metallic spacer sleeve on each end of said liner and extending into the tubing whereby the ends of said liner are supported against lateral motion relative to the tubing, and a ferrule ring mounted on the projecting end of each spacer sleeve and welded to the sleeve and liner, said rings abutting the ends of the tubing.

3. A casing for a flexible shaft according to claim 2, characterized by a layer of oil resistant material on the internal surface of said tubing and longitudinal fibrous strands in the material of the tubing inhibiting stretching thereof.

R. GLENN BARNES.

References Cited in the file of this patent

UNITED STATES PATENTS

| Number | Name | Date |
|---|---|---|
| 177,490 | Fones et al. | May 16, 1876 |
| 723,135 | Browne | Mar. 17, 1903 |
| 1,586,750 | Joline | June 1, 1926 |
| 1,849,427 | Hook | Mar. 15, 1932 |
| 1,999,051 | Kennedy | Apr. 23, 1935 |
| 2,066,473 | Jorgensen | Jan. 5, 1937 |